(12) United States Patent
Ishigaki et al.

(10) Patent No.: US 11,462,912 B2
(45) Date of Patent: Oct. 4, 2022

(54) NON-CONTACT POWER TRANSMISSION DEVICE, BATTERY PACK AND POWER GRID SYSTEM IN WHICH SAID NONCONTACT POWER TRANSMISSION DEVICE IS USED, AND POWER TRANSMISSION METHOD

(71) Applicant: KABUSHIKI KAISHA TOYOTA CHUO KENKYUSHO, Nagakute (JP)

(72) Inventors: Masanori Ishigaki, Nagakute (JP); Shuntaro Inoue, Nagakute (JP); Keisuke Ishikawa, Nagakute (JP); Kenichi Takagi, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 180 days.

(21) Appl. No.: 16/647,096

(22) PCT Filed: Dec. 19, 2018

(86) PCT No.: PCT/JP2018/046686
§ 371 (c)(1),
(2) Date: Mar. 13, 2020

(87) PCT Pub. No.: WO2019/131361
PCT Pub. Date: Jul. 4, 2019

(65) Prior Publication Data
US 2020/0212678 A1 Jul. 2, 2020

(30) Foreign Application Priority Data
Dec. 28, 2017 (JP) .............................. JP2017-253969

(51) Int. Cl.
*H02J 3/00* (2006.01)
*H02J 3/32* (2006.01)
*H02J 3/46* (2006.01)

(52) U.S. Cl.
CPC . *H02J 3/32* (2013.01); *H02J 3/46* (2013.01)

(58) Field of Classification Search
CPC ..... H02J 3/32; H02J 3/46; H02M 1/00; H01F 27/00; H01F 38/00
See application file for complete search history.

(56) References Cited

U.S. PATENT DOCUMENTS

| 2,049,990 A | * | 8/1936 | Armstrong ................ F16P 3/04 192/137 |
| 6,430,064 B1 | | 8/2002 | Tsuchimoto et al. |
| 10,381,867 B1 | * | 8/2019 | Le ........................... H02M 1/10 |
| 10,476,369 B2 | * | 11/2019 | Chen .................... H03K 17/166 |

(Continued)

FOREIGN PATENT DOCUMENTS

| JP | 3762268 B2 | 4/2006 |
| JP | 2014-007924 A | 1/2014 |
| JP | 2015-019551 A | 1/2015 |

OTHER PUBLICATIONS

Yusuke Hayashi et al. "Contactless DC Connector Based on GaN LLC Converter for Nextgeneration Data Centers". IEEE Transactions on Industry Applications, vol. 51, No. 4, Jul./Aug. 2015, pp. 3244-3253.

(Continued)

*Primary Examiner* — Rexford N Barnie
*Assistant Examiner* — Joseph N Inge
(74) *Attorney, Agent, or Firm* — Oliff PLC

(57) ABSTRACT

A non-contact power transmission device is configured with which a primary circuit that supplies power and a secondary circuit that supplies the power supplied from the primary circuit to a load are coupled via a transformer, the non-contact power transmission device capable of connecting a storage battery and an application using the primary circuit and the secondary circuit.

5 Claims, 15 Drawing Sheets

(56) References Cited

U.S. PATENT DOCUMENTS

| | | | | |
|---|---|---|---|---|
| 2001/0017781 A1* | 8/2001 | Hideaki | ................ | H02M 3/335 363/16 |
| 2002/0141208 A1* | 10/2002 | Nanbu | ................. | H02M 3/338 363/37 |
| 2007/0120636 A1* | 5/2007 | Chen | ......................... | H01F 3/14 336/178 |
| 2009/0067207 A1* | 3/2009 | Nishino | ................. | B60L 5/005 363/126 |
| 2011/0090715 A1* | 4/2011 | Hosotani | ........... | H02M 3/33569 363/21.04 |
| 2011/0103100 A1* | 5/2011 | Hosotani | ................... | H01F 3/10 363/21.02 |
| 2011/0140653 A1* | 6/2011 | Jung | ..................... | H02J 50/005 320/108 |
| 2014/0049990 A1* | 2/2014 | Limpaecher | ...... | H02M 3/33584 363/15 |
| 2018/0350513 A1* | 12/2018 | Murakami | .............. | H02M 3/01 |
| 2019/0165573 A9* | 5/2019 | Perreault | ........... | H02M 3/33571 |

OTHER PUBLICATIONS

Yusuke Hayashi et al. "Versatile Contactless DC Connector Based on Multi-Converter Approach for 380 V DC Distribution System". Journal of Energy and Power Sources, vol. 1, No. 1, 2014, pp. 40-53.

Jan. 28, 2020 Office Action issued in Japanese Patent Application No. 2017-253969.

Jun. 30, 2020 International Preliminary Reporton Patentability issued in International Patent Application No. PCT/JP2018/046686.

* cited by examiner

NON-CONTACT POWER TRANSMISSION DEVICE, BATTERY PACK AND POWER GRID SYSTEM IN WHICH SAID NONCONTACT POWER TRANSMISSION DEVICE IS USED, AND POWER TRANSMISSION METHOD

CROSS REFERENCE TO RELATED APPLICATION

The present application is a U.S. National Phase entry of, and claims priority to, PCT Application No. PCT/JP2018/046686, filed Dec. 19, 2018, which claims priority of Japanese Patent Application No. 2017-253969, filed Dec. 28, 2017, both of which are incorporated herein by reference in their entireties for all purposes.

TECHNICAL FIELD

The present invention relates to a non-contact power transmission device, a battery pack and a power grid system in which the non-contact power transmission device is used, and a power transmission method.

BACKGROUND

A non-contact power supply device is known in which a primary unit and a secondary unit of a coupling transformer are made separable. In a non-contact power supply device, a primary unit is used as a power supplier to supply power to a load connected to a secondary unit in a non-contact manner. For example, the primary unit is placed indoors, and the primary unit and the secondary unit are opposed to each other with window glass or the like therebetween, so that an illumination source or the like connected to the secondary unit placed outdoors can be turned on, for example.

SUMMARY

Technical Problem

However, with the technique described in Patent Document 1, it is difficult to maintain the efficiency with respect to the distance between the cores, and highly efficient non-contact power transmission is not achieved. For example, the efficiency mentioned therein is 85% or less when the distance between the cores is 5 mm.

Additionally, with the technology described in Non-Patent Document 1, the transformer part of the resonant converter is used as a connector, so that the efficiency may be increased, but the load conditions are limited and the range of application is limited.

Aside from this, for the technique described in Non-Patent Document 2, the shape of a transformer is illustrated, but no verification has been made with an actual device. Besides, when the transformer structure described in Non-Patent Document 2 is applied to the circuit described in Non-Patent Document 1, the degree of freedom in designing the leakage inductance is low, and the degree of freedom for application is also low.

Solution to Problem

One aspect of the present invention is a non-contact power transmission device in which a primary circuit for supplying power and a secondary circuit for supplying power supplied from the primary circuit, to a load are coupled via a transformer, and a power storage unit and an application are connectable through the primary circuit and the secondary circuit.

Here, a primary winding on the primary circuit side of the transformer is preferably divided, and a primary switching element for current control is preferably provided to each of the divided primary windings, a secondary winding on the secondary circuit side of the transformer is preferably divided, and a secondary switching element for current control is preferably provided to each of the divided secondary windings, and through switching control over the primary switching element and the secondary switching element, power is preferably transmitted between the primary circuit and the secondary circuit.

To be specific, in the primary circuit, the primary winding preferably includes a first primary winding and a second primary winding connected in series via a primary common capacitor, a first primary switching element and a first primary capacitor are preferably connected in parallel to the first primary winding, and a second primary switching element and a second primary capacitor are preferably connected in parallel to the second primary winding; in the secondary circuit, the secondary winding preferably includes a first secondary winding and a second secondary winding connected in series via a secondary common capacitor, a first secondary switching element and a first secondary capacitor are preferably connected in parallel to the first secondary winding, and a second secondary switching element and a second secondary capacitor are preferably connected in parallel to the second secondary winding; and the design of the coupling ratio of at least one of the first primary winding, the second primary winding, the first secondary winding, and the second secondary winding is preferably changeable.

Further, the transformer preferably includes a convex core and a concave core having shapes engageable to each other, and the primary winding is preferably wound around one of the convex core and the concave core, and the secondary winding is preferably wound around the other of the convex core and the concave core.

Further, one primary circuit selected from a plurality of the primary circuits having the primary windings with different numbers of turns and the secondary circuit are preferably combined so that a ratio between the numbers of turns of the primary winding and the secondary winding is changeable.

Further, one secondary circuit selected from a plurality of the secondary circuits having the secondary windings with different numbers of turns and the primary circuit are preferably combined so that a ratio between the numbers of turns of the primary winding and the secondary winding is changeable.

Another aspect of the present invention is a battery pack including a plurality of non-contact power transmission devices.

Here, the battery pack preferably includes a drive unit for generating drive force from part of the power in the power storage unit included in the battery pack, and the battery pack device is preferably movable with the drive force generated by the drive unit.

Another aspect of the present invention is a power grid system in which a plurality of non-contact power transmission devices are connected in parallel.

Another aspect of the present invention is a power transmission method in which electric power is transmitted using the non-contact power transmission device.

Advantageous Effects of Invention

According to the present invention, safe power transmission can be achieved while preventing a short circuit at the terminals and deterioration of the system. Further, combining circuits having different turns ratios of transformers makes a power transmission system that can be applied to various uses. Furthermore, the features of the circuits can be applied to enable the coupling ratios of transformers to be designed more flexibly than in conventional ones, so that high output can be achieved.

DESCRIPTION OF EMBODIMENTS

Figure 1:
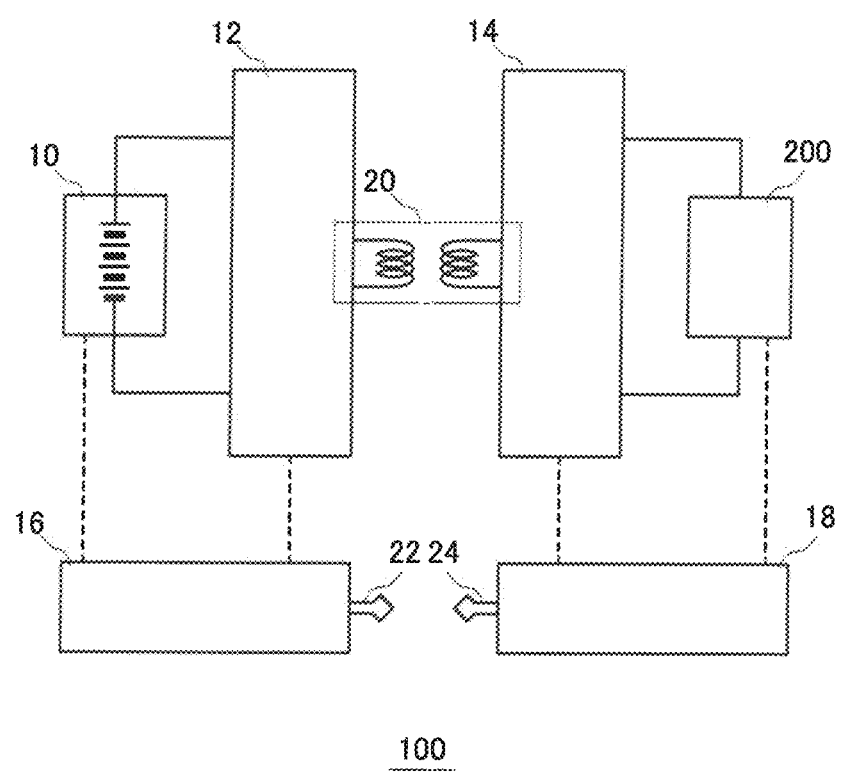
FIG. 1 is a diagram showing the configuration of a non-contact power transmission device according to an embodiment of the present invention.

As shown in FIG. 1, a non-contact power transmission device 100 according to an embodiment of the present invention includes a storage battery 10, a primary circuit 12, a secondary circuit 14, a primary control unit 16, and a secondary control unit 18. The non-contact power transmission device 100 is used while being connected to an application 200.

In the non-contact power transmission device 100, the primary circuit 12 and the secondary circuit 14 are electromagnetically coupled through a transformer 20 without making a wired electrical connection. The primary circuit 12 and the secondary circuit 14 each include a DC-AC conversion circuit and an AC-DC conversion circuit. The primary circuit 12 and the secondary circuit 14 may include other circuits such as a DC-DC voltage conversion circuit. The non-contact power transmission device 100 transmits power between the primary circuit 12 and the secondary circuit 14 so that power is supplied from the storage battery 10 connected to the primary circuit 12 to the application 200 (load) connected to the secondary circuit 14 or so that the storage battery 10 connected to the primary circuit 12 is charged with power from the application 200 (power supply unit) connected to the secondary circuit 14.

The primary control unit 16 controls the primary circuit 12. For example, the primary control unit 16 controls a DC-AC conversion circuit and the like included in the primary circuit 12. The secondary control unit 18 controls the secondary circuit 14. For example, the secondary control unit 18 controls an AC-DC conversion circuit and the like included in the secondary circuit 14. The primary control unit 16 and the secondary control unit 18 include wireless communication units 22 and 24, respectively, and control the non-contact power transmission device 100, achieving synchronization between the control of the primary circuit 12 and the control of the secondary circuit 14 as necessary.

In the non-contact power transmission device 100, charging and discharging of the storage battery 10 can be controlled in accordance with the state of charge (SoC) and temperature of the storage battery 10. In addition, use of the wireless communication units 22 and 24 enables non-contact power transmission between the primary circuit 12 and the secondary circuit 14.

Figure 2:
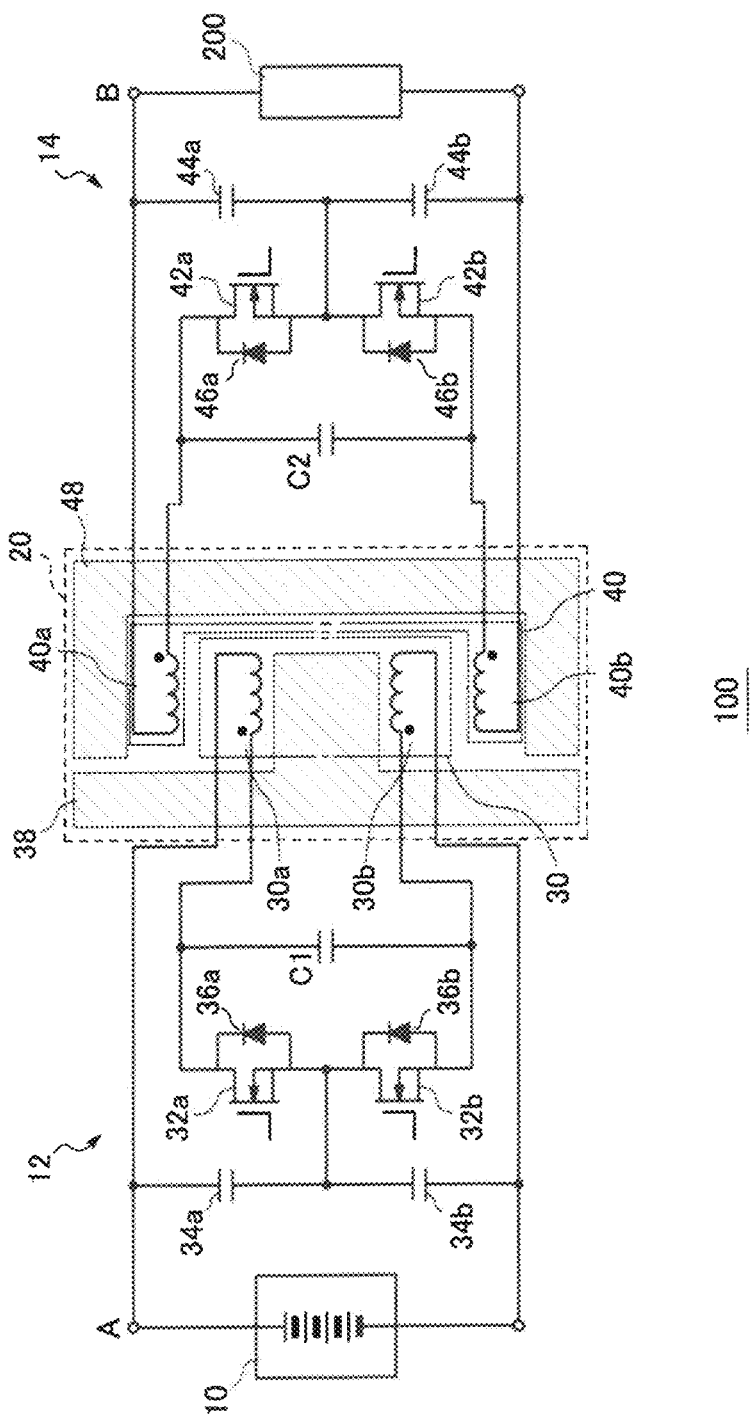
FIG. 2 is a diagram showing a specific example of the configuration of the non-contact power transmission device according to the embodiment of the present invention.

FIG. 2 shows a specific example of the circuit configuration of the non-contact power transmission device 100. The non-contact power transmission device 100 includes a combination of the primary circuit 12 including a primary winding 30, switching elements 32a and 32b, capacitors 34a and 34b, and free-wheel diodes 36a and 36b, and the secondary circuit 14 including a secondary winding 40, switching elements 42a and 42b, capacitors 44a and 44b, and free-wheel diodes 46a and 46b. In FIG. 2, illustration of the primary control unit 16 and the secondary control unit 18 is omitted.

The primary winding 30 of the transformer 20 included in the primary circuit 12 is divided into divided windings 30a and 30b. The divided winding 30a is connected between the switching element 32a and the capacitor 34a. The free-wheel diode 36a is connected in parallel to the switching element 32a. The divided winding 30b is connected between the switching element 32b and the capacitor 34b. The free-wheel diode 36b is connected in parallel to the switching element 32b. The connection point between the divided winding 30a and the switching element 32a and the connection point between the switching element 32b and the switching element 32b are connected through a capacitor C1. Further, the connection point between the capacitor 34a and the switching element 32a and the connection point between the capacitor 34b and the switching element 32b are short-circuited. In the primary circuit 12, the switching elements 32a and 32b are exclusively and alternately turned on and off.

The secondary winding 40 of the transformer 20 included in the secondary circuit 14 is divided into divided windings 40a and 40b. The divided winding 40a is connected between the switching element 42a and the capacitor 44a. The free-wheel diode 46a is connected in parallel to the switching element 42a. The divided winding 40b is connected between the switching element 42b and the capacitor 44b. The free-wheel diode 46b is connected in parallel to the switching element 42b. The connection point between the divided winding 40a and the switching element 42a and the connection point between the switching element 42b and the switching element 42b are connected through a capacitor C2. Further, the connection point between the capacitor 44a and the switching element 42a and the connection point between the capacitor 44b and the switching element 42b are short-circuited. In the secondary circuit 14, the switching elements 42a and 42b are exclusively and alternately turned on and off. The switching duty of the secondary circuit 14 is basically equal to the switching duty of the primary circuit 12.

The primary circuit 12 is provided with a port A. The secondary circuit 14 is provided with a port B. The storage battery 10 is connected to the port A, and the application 200 is connected to the port B. In the non-contact power transmission device 100, the primary winding 30 and the secondary winding 40 are electromagnetically coupled. Hence, the primary circuit 12 provided with the port A and the secondary circuit 14 provided with the port B are electromagnetically coupled.

In this example of the non-contact power transmission device 100, the divided windings 30a and 30b included in the primary circuit 12 are wound around one primary core 38. The divided windings 40a and 40b included in the secondary circuit 14 are wound around one secondary core 48. When the phase difference between the switching between the switching element 32a and the switching element 32b and the switching between the switching element 42a and the switching element 42b is 0, the divided windings 30a and 30b and the divided windings 40a and 40b are preferably wound in the direction in which magnetic flux is generated in the primary core 38 and in the secondary core 48 in the same direction.

The transmission power $P_{dd}$ of the non-contact power transmission device 100 can be expressed by Expressions (1) and (2). Here, $V_{in}$ is the voltage between the terminals of the port A of the primary circuit 12, $V_{out}$ is the voltage between the terminals of the port B of the secondary circuit 14, $\omega$ is a value obtained from the operating frequency, and $\Phi$ is the bridge operation phase of the primary circuit 12 and the secondary circuit 14. $L_1$ is the self-inductance of the divided windings 30a, 30b, 40a, and 40b, $k_p$ is the coupling coefficient between the divided windings 30a and 30b and the divided windings 40a and 40b, and $k_{ps}$ is the coupling coefficient between the divided winding 30a and the divided winding 40a, between the divided winding 30a and the divided winding 40b, between the divided winding 30b and the divided winding 40a, and between the divided winding 30b and the divided winding 40b.

[Expression 1]

$$P_{dd} = \frac{V_{in} k_{ps} V_{out}}{\omega L_{eq} \pi} \phi(\pi - \phi) \qquad (1)$$

[Expression 2]

$$L_{eq} = 2(1 - k_p)(2L_1) + 2(k_p - k_{ps})(2L_1) \qquad (2)$$

The features of the coupling coefficient $k_{ps}$ will now be described. In general, the coupling ratio of the transformer 20 is determined by Expression (3) using the inductance $L_{open}$ observed when the other winding is opened and the inductance $L_{short}$ observed when the other winding is short-circuited.

[Expression 3]

$$K = \sqrt{1 - \frac{L_{short}}{L_{open}}} \qquad (3)$$

Figure 3:
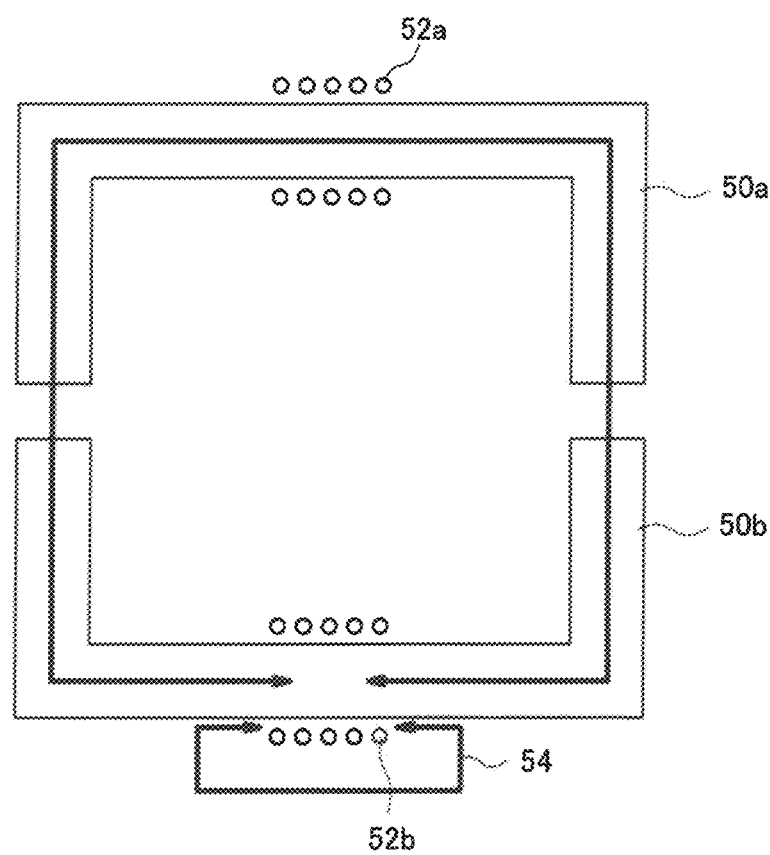
FIG. 3 is a diagram showing an example of the configuration of a core and the related magnetic flux.
Figure 4:
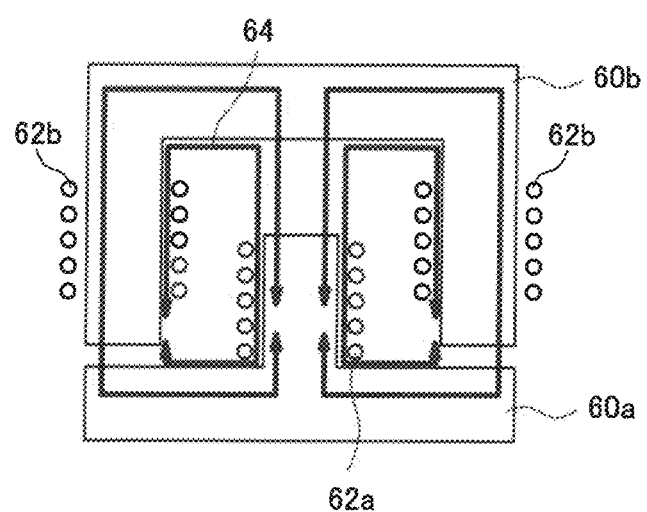
FIG. 4 is a diagram showing an example of the configuration of a convex core and a concave core and the related magnetic flux.

In the configuration of cores 50a and 50b and windings 52a and 52b shown in FIG. 3 (magnetic flux is indicated by the thick arrow line in the drawing), there is no core path closed in relation to magnetic flux 54, and the coupling coefficient $k_{ps}$ is made small to reduce the amount of interlinkage with the other core. Consequently, the transmission power $P_{dd}$ represented by Expression (1) also decreases. On the contrary, as shown in FIG. 4, in the configuration in which a convex core 60a and a concave core 60b are combined and windings 62a and 62b are wound around them, respectively, magnetic flux 64 is structurally closed within the convex core 60a and the concave core 60b, and the coupling coefficient $k_{ps}$ is larger than that in the configuration shown in FIG. 3. As described above, the electromagnetic coupling ratio (coupling coefficient $k_{ps}$) between the primary and secondary units varies depending on the structure, and the configuration shown in FIG. 4 is advantageous for power transmission.

Although the coupling ratio (coupling coefficient $k_{ps}$) can be increased by bringing the primary winding 30 and the secondary winding 40 closer to each other, assuming that the primary circuit 12 and the secondary circuit 14 are attached and detached as in the non-contact power transmission device 100, a lower limit of the distance therebetween is provided to secure a physical distance for fitting. In other words, an upper limit of the coupling ratio (coupling coefficient $k_{ps}$) also exists according to the limit of the physical distance between the primary winding 30 and the secondary winding 40.

In the non-contact power transmission device 100 shown in FIG. 2, $L_{eq}$ depends on ($k_p$-$k_{ps}$) as shown in Expression (2), so that the transmission power $P_{dd}$ can be increased by decreasing the coupling coefficient $k_p$.

Figure 5A:
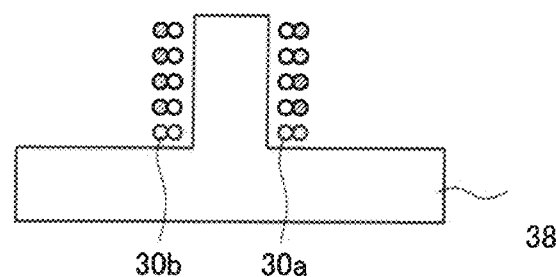
FIG. 5A is a diagram for describing a design of winding of a core.
Figure 5B:
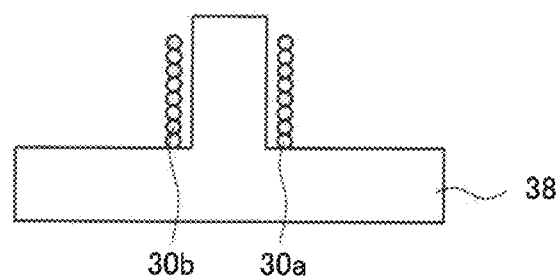
FIG. 5B is a diagram for describing a design of winding of a core.
Figure 5C:
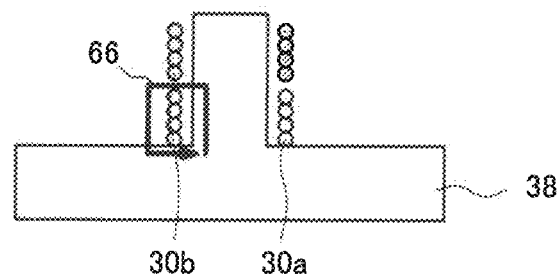
FIG. 5C is a diagram for describing a design of winding of a core.

For this reason, the coupling coefficient $k_p$ will now be examined. FIGS. 5A to 5C show three configurations that are different in the way the divided winding 30a (indicated by white circles in the drawing) and the divided winding 30b (indicated by hatched circles in the drawing) of the primary winding 30 are wound. FIG. 5A shows the case where the divided winding 30a and the divided winding 30b have a twisted winding structure. In other words, in this structure, after winding of one of the divided windings 30a and 30b, the other is wound around this workpiece. The twisted winding structure is a structure that yields the largest coupling coefficient $k_p$, and in which the magnetic fluxes generated by the divided winding 30a and the divided winding 30b are closely linked. FIG. 5B shows the case where the divided winding 30a and the divided winding 30b have a parallel winding structure. In other words, in this configuration, the divided winding 30a and the divided winding 30b are wound alternately along the axial direction. In the parallel winding structure, as in the twisted winding structure, the magnetic fluxes generated by the divided windings 30a and 30b are almost linked. FIG. 5C shows the case where the divided winding 30a and the divided winding 30b have an independent winding structure. In other words, in this configuration, a portion where the divided winding 30a is wound along the axial direction and a portion where the divided winding 30b is wound along the axial direction are independent of each other. In the independent winding structure, magnetic fluxes 66 that do not intersect each other are generated, so that the leaking magnetic flux increases, and the coupling coefficient $k_p$ decreases from those in the twisted winding structure and the parallel winding structure.

Although the winding structure of the divided winding 30a and the divided winding 30b of the primary winding 30 has been described here, the same applies to the divided winding 40a and the divided winding 40b of the secondary winding 40.

In contrast, the self-inductance L1 does not change significantly from that in the winding structure of the divided windings 30a and 30b and the winding structure of the divided windings 40a and 40b.

Accordingly, when the transformer 20 is made with an appropriate combination of a core shape and a winding structure, even if the distance between the primary winding 30 and the secondary winding 40 is large, the coupling coefficient $k_{ps}$ can be increased and the coupling coefficient $k_p$ can be decreased to achieve a large transmission power $P_{dd}$.

Figure 6:
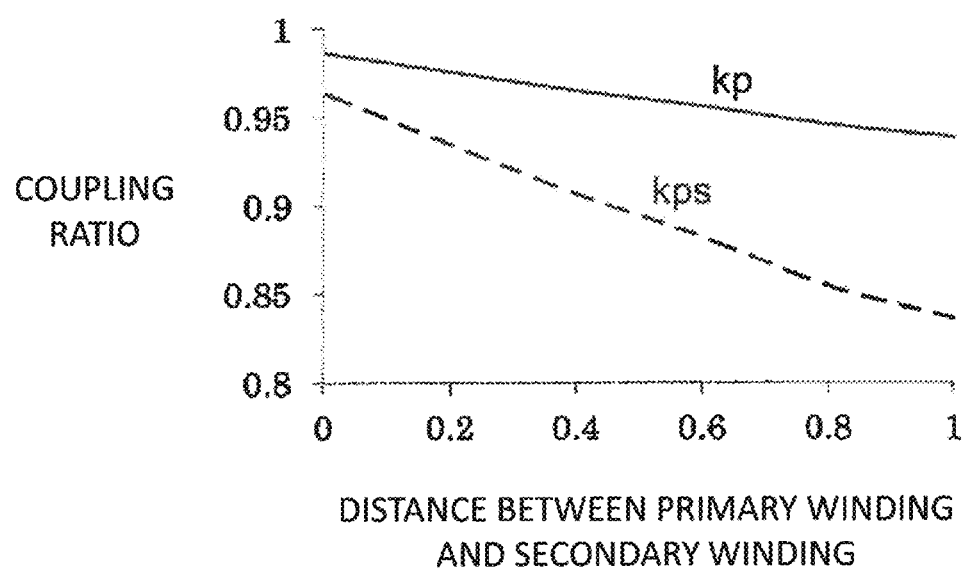
FIG. 6 is a diagram showing a change in the coupling ratio (coupling coefficient) with respect to the distance between the primary and secondary units of the non-contact power transmission device according to the embodiment of the present invention.
Figure 7:
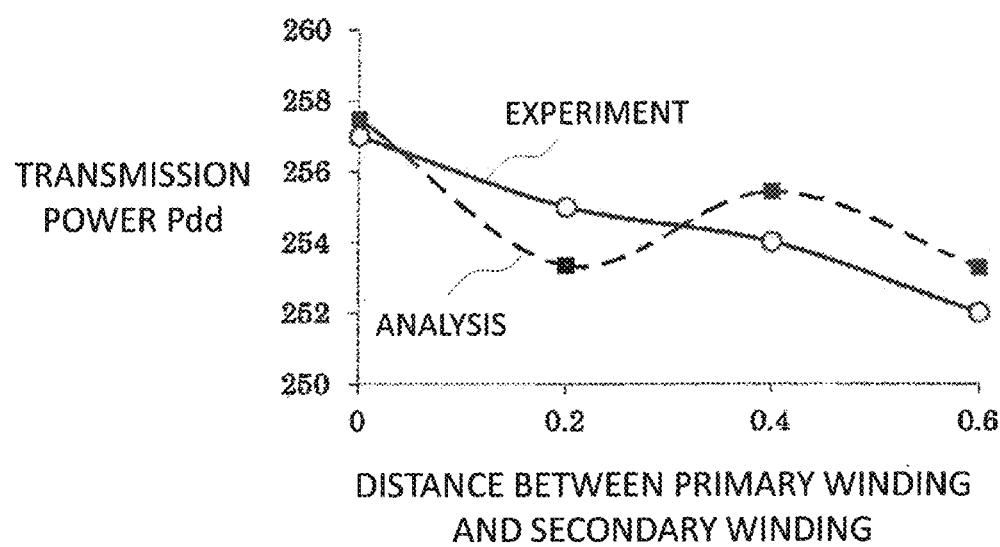
FIG. 7 is a diagram showing a change in transmission power with respect to the distance between the primary and secondary units of the non-contact power transmission device according to the embodiment of the present invention.

FIGS. 6 and 7 show the coupling ratio (solid line:coupling coefficient $k_p$, dashed line:coupling coefficient $k_{ps}$) obtained when the parallel winding structure is applied to the core shape obtained by combining the convex core 60a and the concave core 60b shown in FIG. 4, and the transmission power $P_{dd}$ (solid line: experimental result, dashed line: analysis result). The horizontal axis in FIGS. 6 and 7 indicates the distance between the primary winding 30 and the secondary winding 40.

As shown in FIG. 6, as the distance between the primary winding 30 and the secondary winding 40 increases, the coupling ratios (the coupling coefficient $k_p$ and the coupling coefficient $k_{ps}$) decrease. However, the coupling coefficient $k_{ps}$ decreases with the distance between the primary winding 30 and the secondary winding 40 by a higher rate than the coupling coefficient $k_p$. Such a relationship between the coupling coefficient $k_p$ and the coupling coefficient $k_{ps}$ shows that, as shown in FIG. 7, the transmission power $P_{dd}$ expressed by Expressions (1) and (2) in a certain area increases and decreases with the distance between the primary winding 30 and the secondary winding 40.

Figure 8:
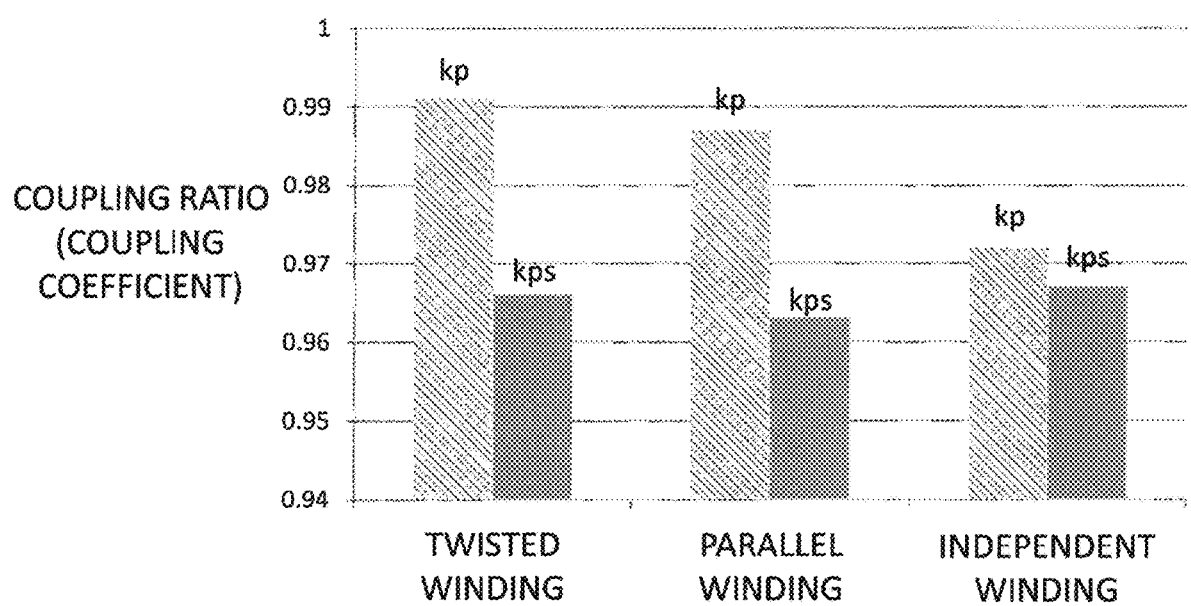
FIG. 8 is a diagram showing a change in the coupling ratio (coupling coefficient) with respect to the winding structure of the non-contact power transmission device according to the embodiment of the present invention.
Figure 9:
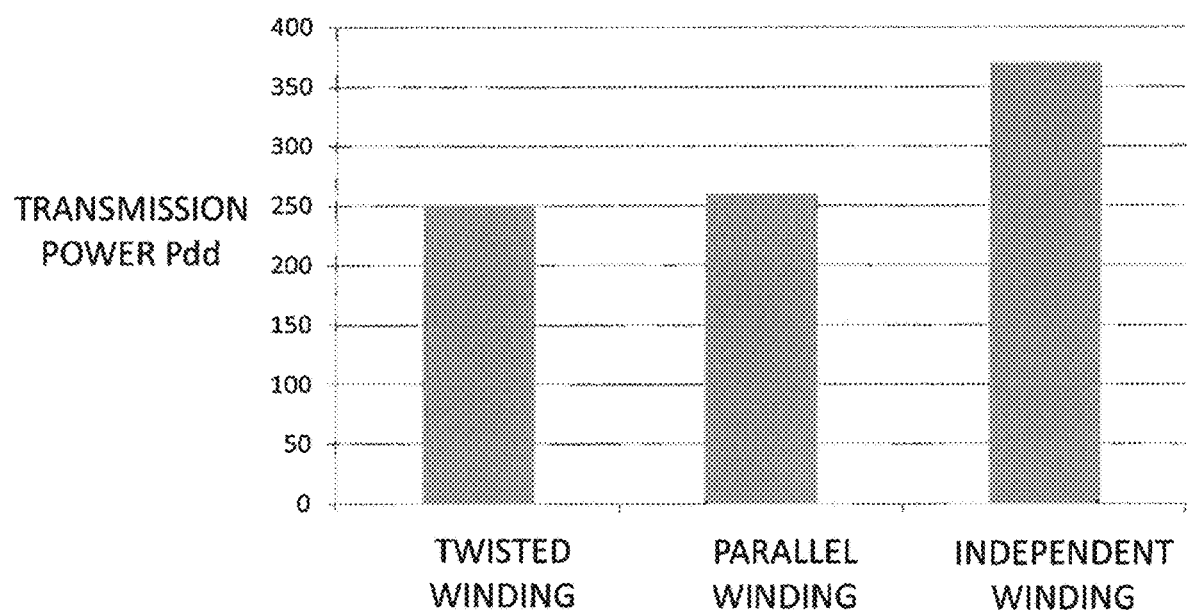
FIG. 9 is a diagram showing a change transmission power with respect to the winding structure of the non-contact power transmission device according to the embodiment of the present invention.

FIG. 8 shows a ratio between the coupling ratios (the coupling coefficient $k_p$ and the coupling coefficient $k_{ps}$) obtained when the twisted winding structure, the parallel winding structure, and the independent winding structure are applied to the core shape obtained by combining the convex core 60a and the concave core 60b shown in FIG. 4. FIG. 9 shows the transmission power $P_{dd}$ obtained when the twisted winding structure, the parallel winding structure, and the independent winding structure are applied to the core shape obtained by combining the convex core 60a and the concave core 60b shown in FIG. 4.

As shown in FIG. 8, changing the winding structure can change the coupling coefficient $k_p$ with almost no change in the coupling coefficient $k_{ps}$. Hence, as shown in FIG. 9, the transmission power $P_{dd}$ (output characteristics) can be appropriately designed.

The winding structure is not limited to the twisted winding structure, the parallel winding structure, and the independent winding structure, and may be changed as appropriate. For example, a combination of multiple winding structures may be used. In particular, for example, a part of the winding may have the twisted winding structure and the remaining part may have the parallel winding structure; alternatively, a part of the winding may have the twisted winding structure and the remaining part may have the independent winding structure. Other combinations are also applicable.

Application Example 1 of Non-Contact Power Transmission Device

In the non-contact power transmission device 100 according to this embodiment, an appropriate combination of the primary circuit 12 and the secondary circuit 14 leads to power transmission with appropriate efficiency according to the application 200.

Figure 10:
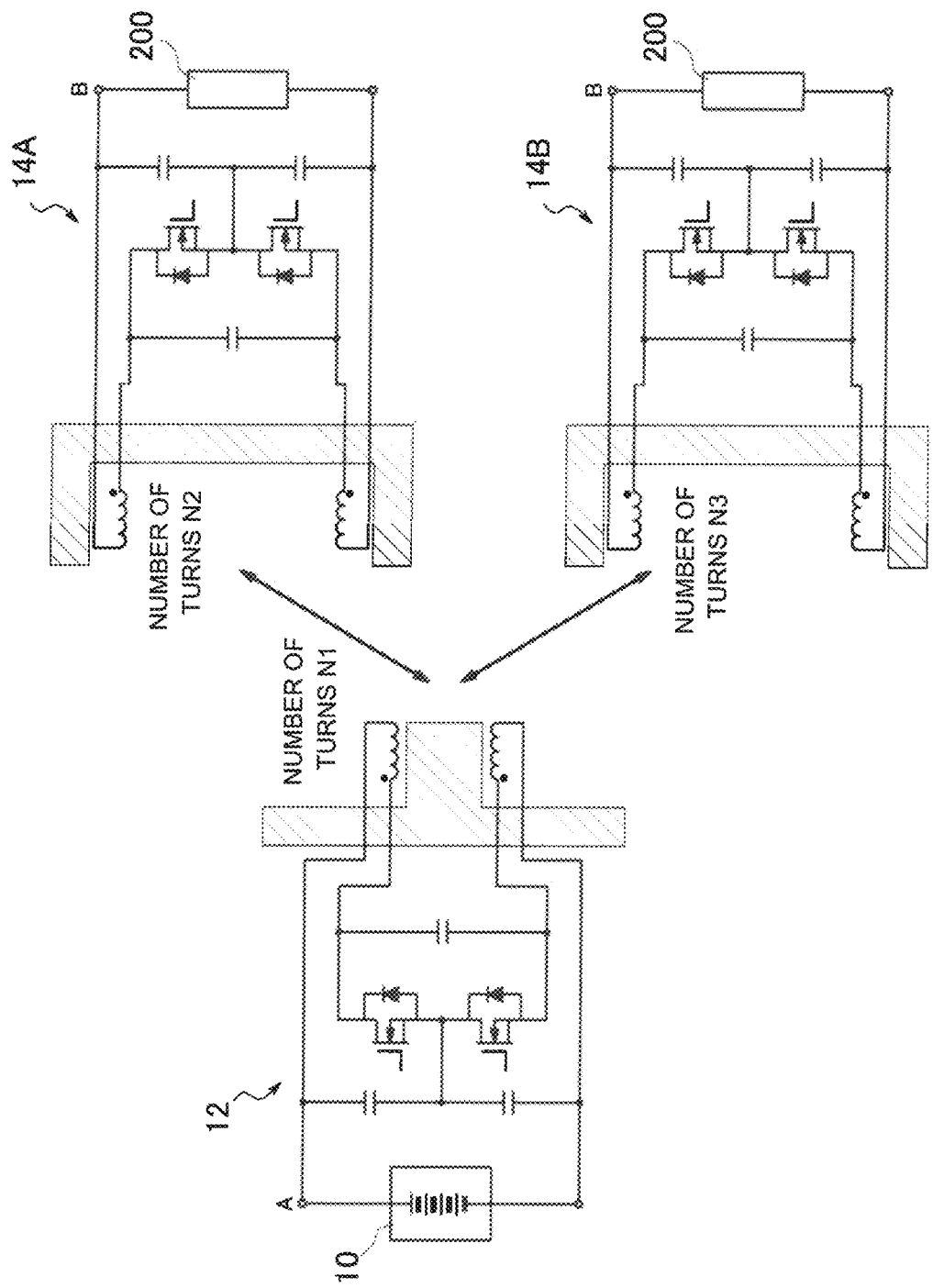
FIG. 10 is a diagram showing Application 1 of the non-contact power transmission device according to the embodiment of the present invention.

For example, as shown in FIG. 10, combining one secondary circuit 14 selected from a plurality of secondary circuits 14, having different numbers of turns, of the secondary winding 40 and a primary circuit 12 makes the ratio between the numbers of turns of the primary winding 30 and the secondary winding 40 appropriately changeable. Accordingly, power transmission can be achieved with appropriate efficiency according to the combination of the storage battery 10 and the application 200.

Figure 11:
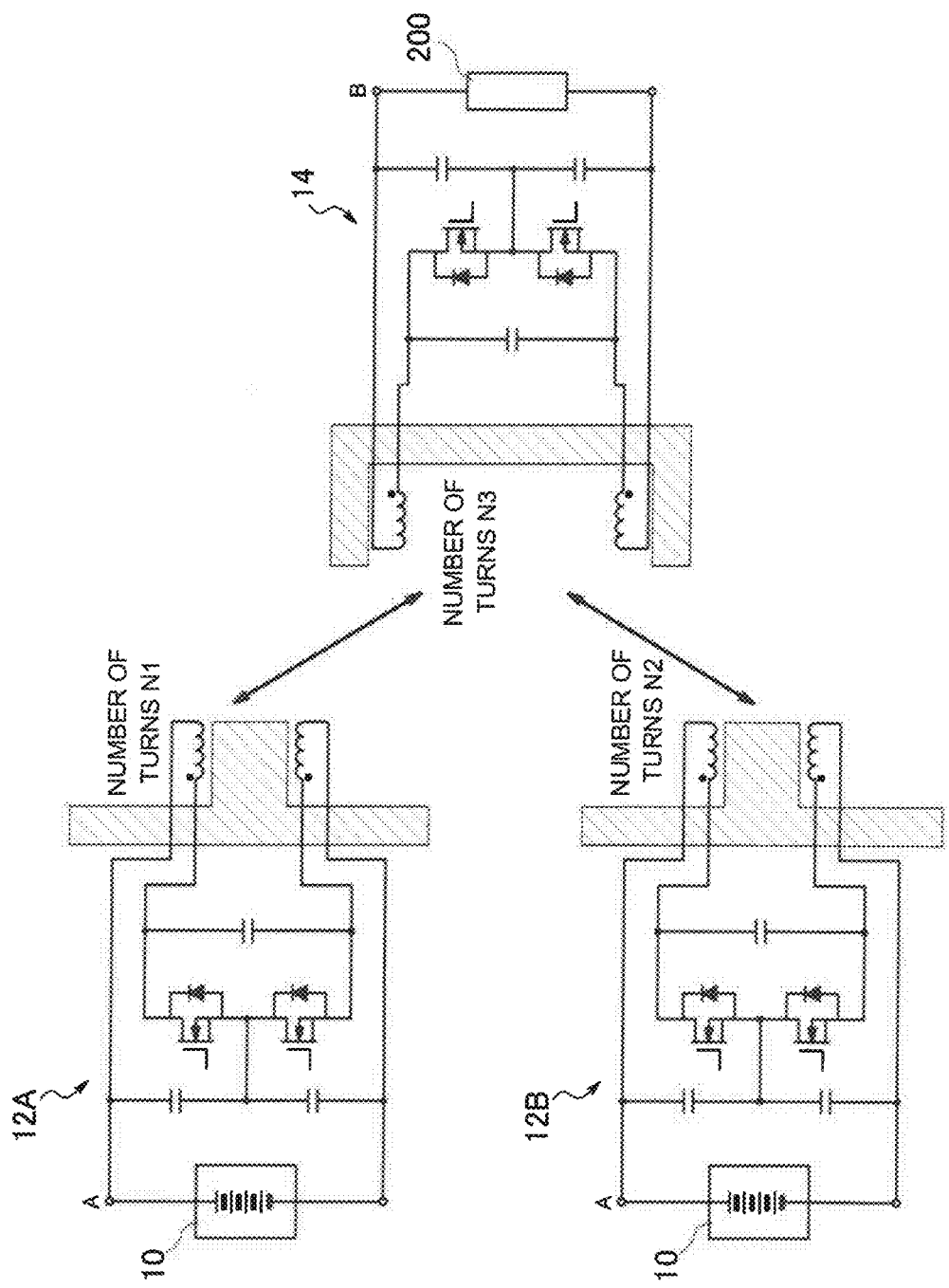
FIG. 11 is a diagram showing an Application Example 1 of the non-contact power transmission device according to the embodiment of the present invention.

For example, as shown in FIG. 11, combining one primary circuit 12 selected from a plurality of primary circuits 12, having different numbers of turns, of the primary winding 30 and a secondary circuit 14 makes the ratio between the numbers of turns of the primary winding 30 and the secondary winding 40 changeable. Accordingly, power transmission can be achieved with appropriate efficiency according to the combination of the storage battery 10 and the application 200.

Application Example 2 of Non-Contact Power Transmission Device

Figure 12:
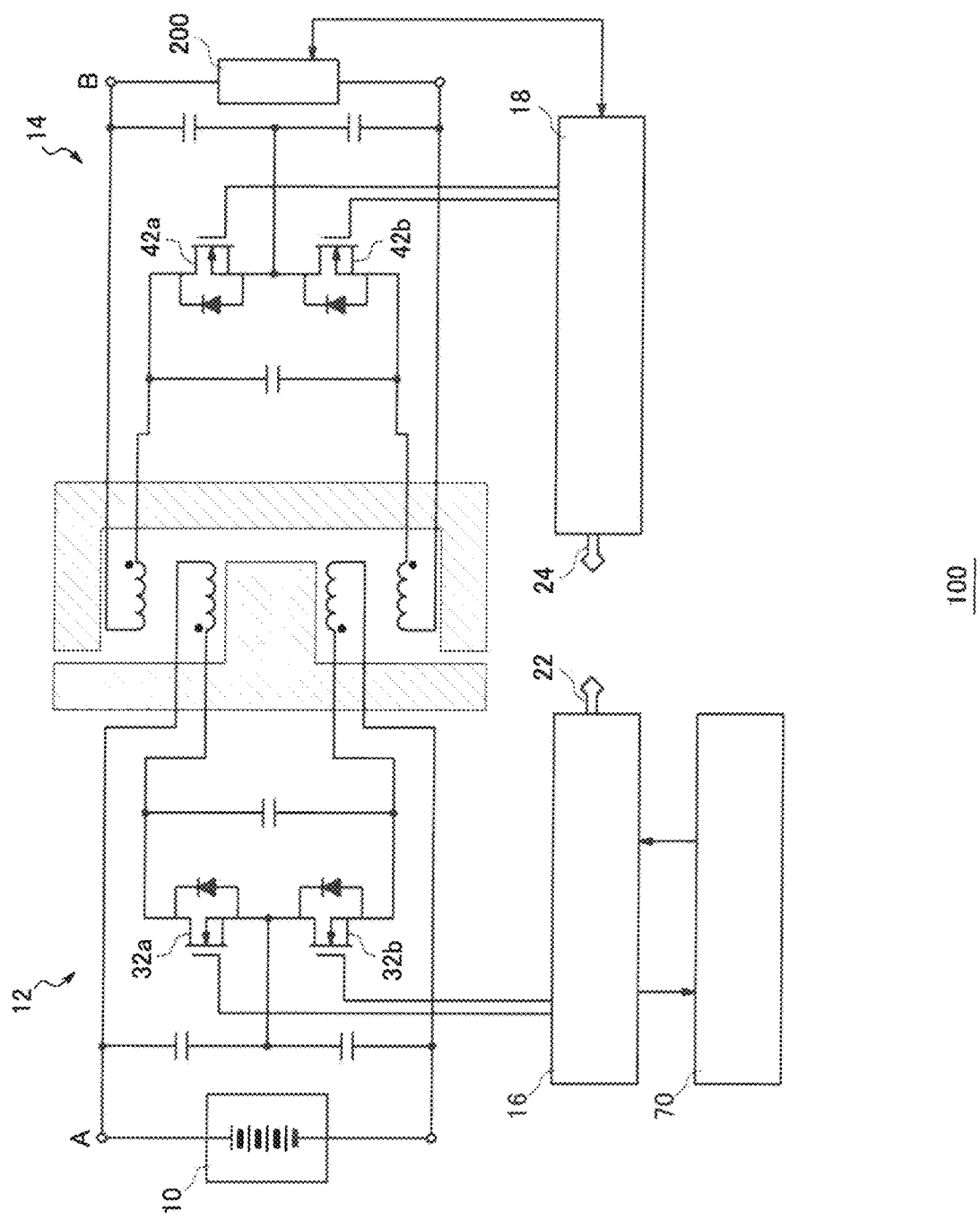
FIG. 12 is a diagram showing an Application Example 2 of the non-contact power transmission device according to the embodiment of the present invention.

FIG. 12 shows a configuration example of a control unit for the non-contact power transmission device 100. The primary control unit 16 includes a gate drive circuit that controls switching of the switching elements 32a and 32b of the primary circuit 12. Further, the primary control unit 16 includes a communication unit including the wireless communication unit 22. The primary control unit 16 receives a gate control signal from a controller 70 and controls the gate voltages of the switching elements 32a and 32b.

The secondary control unit 18 includes a gate drive circuit that controls switching of the switching elements 42a and 42b of the secondary circuit 14. Further, the secondary control unit 18 includes a communication unit including a wireless communication unit 24. The controller 70 transmits a gate control signal to the secondary control unit 18 via the wireless communication unit 22 of the primary control unit 16 and the wireless communication unit 24 of the secondary control unit 18. The secondary control unit 18 receives a gate control signal from the controller 70 and controls the gate voltages of the switching elements 42a and 42b. Thus, the switching between the primary circuit 12 and the secondary circuit 14 can be synchronized.

When the application 200 needs to be controlled, the application 200 may be controlled by the controller 70 via the wireless communication unit 22 and the wireless communication unit 24. For example, the state value of the application 200 is transmitted to the controller 70 via the wireless communication unit 22 and the wireless communication unit 24, and a control signal based on that value is output from the controller 70, thereby achieving feedback control on the application 200.

Note that a configuration in which the primary control unit 16 and the secondary control unit 18 wirelessly communicate is not necessarily used, and a configuration in which the controller 70 and the secondary control unit 18 wirelessly communicate may be used instead. When the controller 70 and the secondary control unit 18 are connected by wire, a configuration may be adopted in which the controller 70 and the primary control unit 16 wirelessly communicate. With these configurations, the non-contact power transmission device 100 can be used in such a manner that the primary circuit 12 and the secondary circuit 14 can be separated.

In the case where wired communication can be achieved, wired communication may be applied instead of wireless communication.

Application Example 3 of Non-Contact Power Transmission Device

Figure 13:
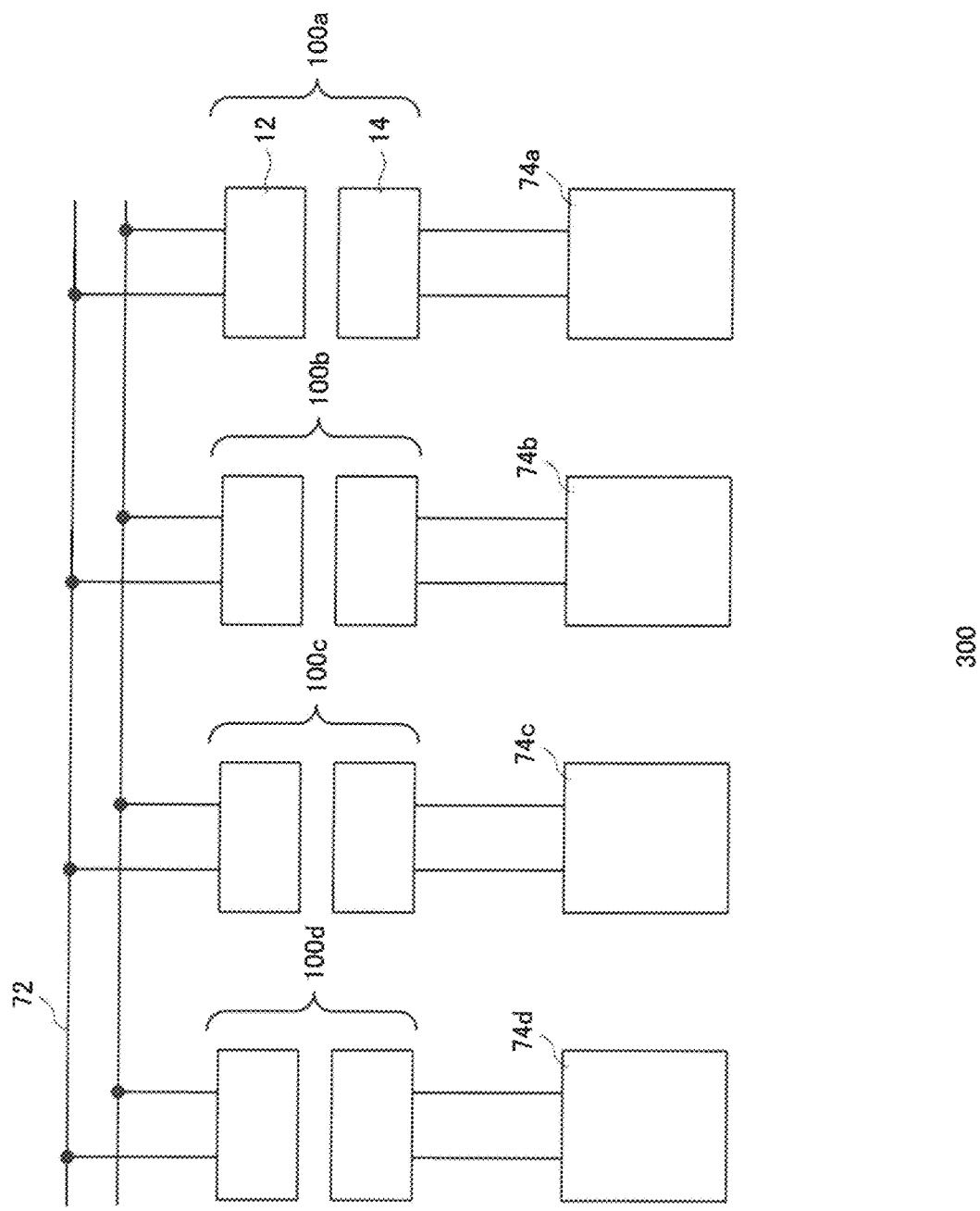
FIG. 13 is a diagram showing an Application Example 3 of the non-contact power transmission device according to the embodiment of the present invention.

The non-contact power transmission device 100 according to this embodiment can be applied to a power grid system. FIG. 13 shows an example of a power grid system 300 to which the non-contact power transmission device 100 is applied.

In the power grid system 300, power storage/power generation devices 74 (74a to 74d) are connected to an application line 72 via the non-contact power transmission devices 100 (100a to 100d), respectively.

Each power storage/power generation device 74 includes a secondary battery or other power storage unit and a solar battery or other power generation units. For example, the power storage/power generation device 74a can be a small secondary battery, the power storage/power generation device 74b can be a large secondary battery, the power storage/power generation device 74c can be a solar battery, and the power storage/power generation device 74d can be an EDLC. The application line 72 can be, for example, a power grid line or a line leading to an application using electric energy.

For the non-contact power transmission devices 100a to 100d, the ratio between the numbers of turns of the primary circuit 12 and the secondary circuit 14 is designed according to the voltages of the power storage/power generation devices 74a to 74d with reference to the voltage of the application line 72. The non-contact power transmission devices 100a to 100d control the power to the power storage/power generation devices 74a to 74d by distributing power according to the power that can be supplied from the application line 72 and the states of the power storage/power generation devices 74a to 74d. For example, a solar battery may be used as a priority power output unit, and when there is excess power in the application line 72, the power may be circulated to the secondary battery to store energy, for example, leading to effective use of energy.

In addition, since the primary and secondary units of the non-contact power transmission device 100 are not in contact, even if a part of the non-contact power transmission device 100 is subjected to a severe environment, for example, is exposed to wind and rain, troubles such as electric leakage can be suppressed and safety can be maintained.

Further, when the power storage/power generation device 74 is additionally installed, since the non-contact power transmission device 100 is a non-contact type device, the application line 72 can be extended without power failure. In other words, the expandability of the power grid system 300 can be improved.

Application Example 4 of Non-Contact Power Transmission Device

Figure 14:
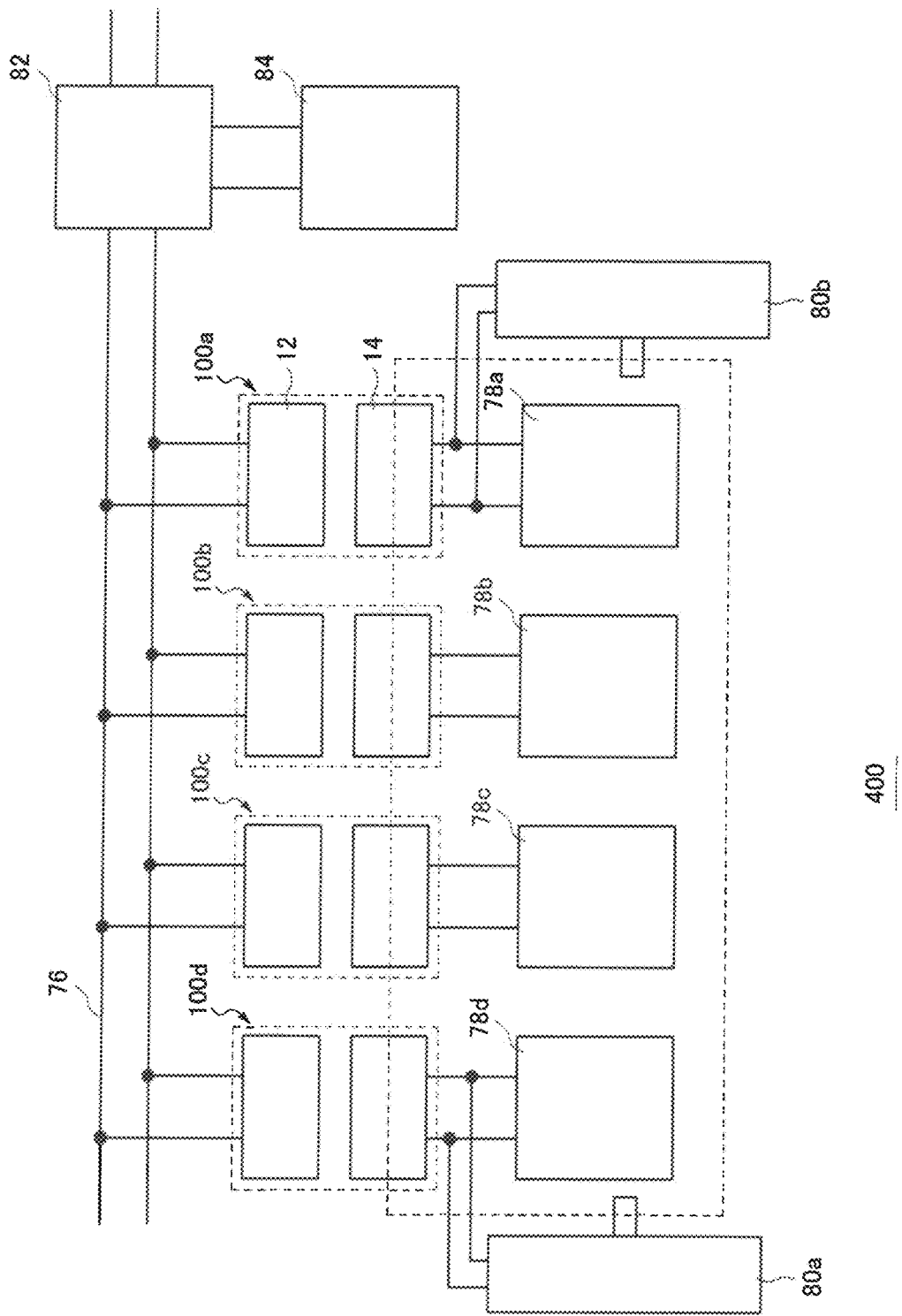
FIG. 14 is a diagram showing an Application Example 4 of the non-contact power transmission device according to the embodiment of the present invention.

The non-contact power transmission device 100 according to this embodiment can be applied to an autonomously moving battery pack 400 that can move autonomously. FIG. 14 shows an example of the autonomously moving battery pack 400.

The primary circuits 12 of the non-contact power transmission devices 100 (100a to 100d) connected to an application line 76 are provided. The autonomously moving battery pack 400 includes the secondary circuits 14 of the non-contact power transmission devices 100 (100a to 100d) electromagnetically coupled to the primary circuits 12, and the secondary circuits 14 are connected to respective power storage devices 78 (78a to 78d). The power storage device 78 includes a power storage unit such as a secondary battery.

In addition, the autonomously moving battery pack 400 includes drive unit 80 (80a and 80b) that generate drive force for moving the autonomously moving battery pack 400 by using power supplied from at least a part of the power storage devices 78 (78a to 78d).

The drive unit 80 may include, for example, wheels coupled to the drive shaft of the motor and have a control unit for controlling the wheels. However, this is not necessarily the case, and the drive unit 80 may be provided with a screw for moving on or in the water, a propeller for flying in the air, or the like.

The power supply to the autonomously moving battery pack 400 and the power supply from the autonomously moving battery pack 400 can be performed through a power converter 82 connected to the application line 76, and an application 84. The application 84 can be a power supply device or a load.

Figure 15:
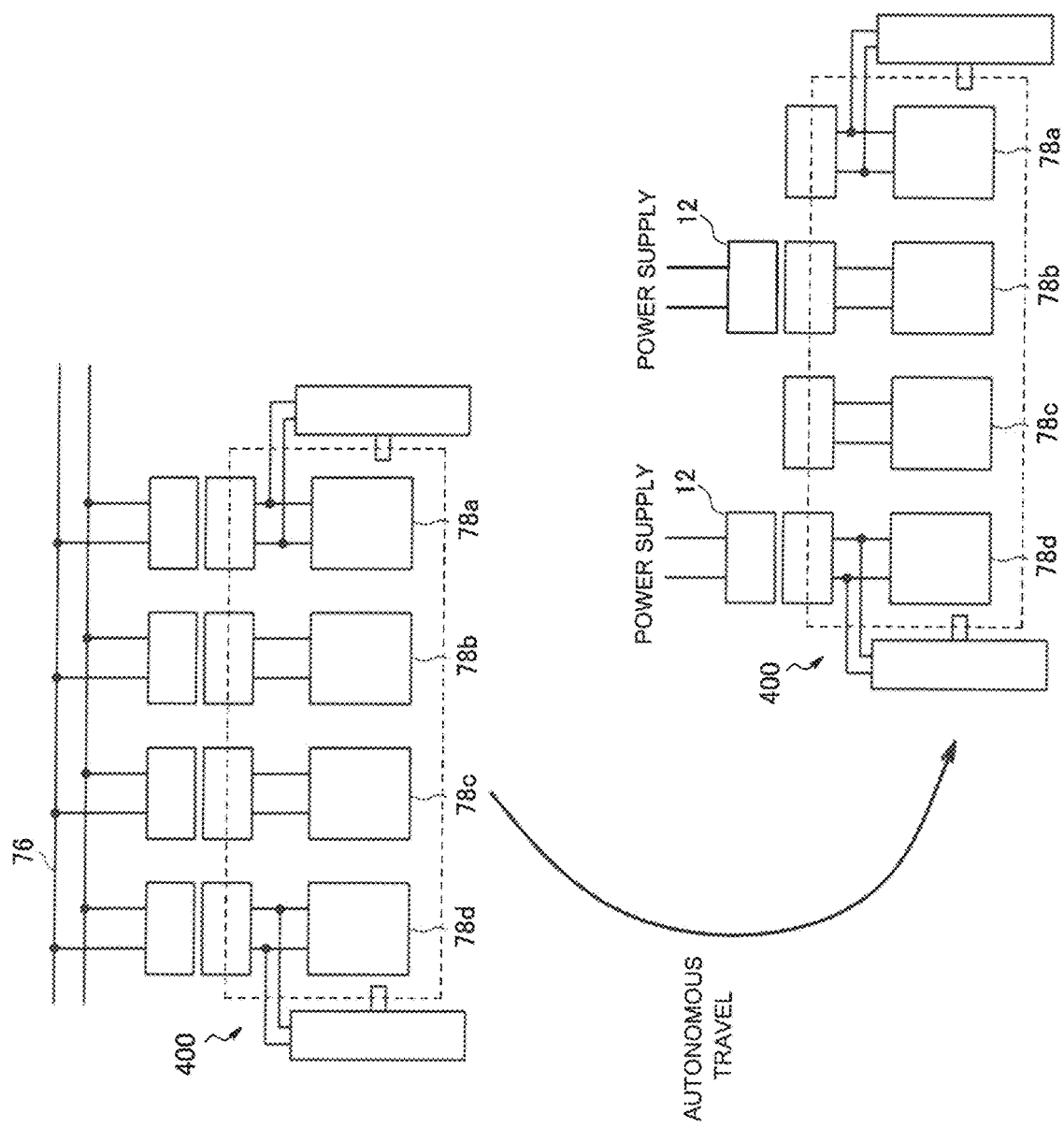
FIG. 15 is a diagram showing the Application Example 4 of the non-contact power transmission device according to the embodiment of the present invention.

The autonomously moving battery pack 400 can be used for power supply. FIG. 15 shows an example of power transfer using the autonomously moving battery pack 400. When the autonomously moving battery pack 400 needs charging, it autonomously connects to the application line 76 used for charging. Thus, the power storage devices 78 (78a to 78d) provided in the autonomously moving battery pack 400 are charged. After the charging, the drive unit 80 causes the autonomously moving battery pack 400 to autonomously run so that the autonomously moving battery pack 400 moves to a place where power is required. At a point where power is demanded, the primary circuit 12 according to the load is prepared, and the primary circuit 12 is coupled to the secondary circuit 14 of the autonomously moving battery pack 400, thereby achieving power supply. When the power storage device 78 is not sufficiently charged, reconnection to another power storage device 78 may be made.

Use of such an autonomously moving battery pack 400 can eliminate the metal terminal portion exposed to the outside, and suppress occurrence of troubles such as electric leakage due to water droplets or the like. It also enables power transfer to places that people cannot easily reach in the event of a disaster or the like. It further enables autonomous travel for charging power generators located in places that people can hardly reach, such as solar batteries and wind power generators.

The invention claimed is:

1. A non-contact power transmission device comprising:
a primary circuit for supplying power; and
a secondary circuit for supplying power supplied from the primary circuit to an application, the primary circuit and the secondary circuit being coupled via a transformer, the application being a load or a power supply device, wherein
a primary winding on the primary circuit side of the transformer is divided, and a primary switching element for current control is provided to each of the divided primary windings,
a secondary winding on the secondary circuit side of the transformer is divided, and a secondary switching element for current control is provided to each of the divided secondary windings,
in the primary circuit, the primary winding comprises:
a first primary winding and a second primary winding connected in series via a primary common capacitor;
a first primary switching element and a first primary capacitor are connected in parallel to the first primary winding, the first primary switching element being directly connected to the first primary winding at a first connection point; and
a second primary switching element and a second primary capacitor are connected in parallel to the second primary winding, the second primary switching element being directly connected to the second primary winding at a second connection point, and the primary common capacitor being directly connected between the first primary winding and the second primary winding at the first connection point and the second connection point;
in the secondary circuit, the secondary winding comprises:
a first secondary winding and a second secondary winding connected in series via a secondary common capacitor;
a first secondary switching element and a first secondary capacitor are connected in parallel to the first secondary winding, the first secondary switching element being directly connected to the first secondary winding at a third connection point; and
a second secondary switching element and a second secondary capacitor are connected in parallel to the second secondary winding, the second secondary switching element being directly connected to the second secondary winding at a fourth connection point, and the secondary common capacitor being directly connected between the first secondary winding and the second secondary winding at the third connection point and the fourth connection point;
a design of a coupling ratio of at least one of the first primary winding, the second primary winding, the first secondary winding, and the second secondary winding is changeable,
through switching control over the primary switching element and the secondary switching element, power is transmitted between the primary circuit and the secondary circuit, and
a power storage unit and the application are connectable through the primary circuit and the secondary circuit.

2. A battery pack comprising a plurality of non-contact power transmission devices according to claim 1.

3. A battery pack comprising:
a plurality of non-contact power transmission devices according to claim 1; and
a drive unit for generating drive force from power in the power storage unit included in the battery pack, wherein
the battery pack is movable with the drive force generated by the drive unit.

4. A power grid system comprising:
a plurality of non-contact power transmission devices according to claim 1 wherein
the plurality of non-contact power transmission devices are connected in parallel.

5. A power transmission method comprising:
transmitting power using the non-contact power transmission device according to claim 1.

* * * * *